United States Patent
Sing et al.

(10) Patent No.: US 7,047,592 B2
(45) Date of Patent: May 23, 2006

(54) COMBINATION BLOWER ASSEMBLY AND STRING TRIMMER

(75) Inventors: J. Barney Sing, Chandler, AZ (US); Amit Saha, North Ridgeville, OH (US); Raul F. Vidal, Gilbert, AZ (US); Neil G. Griffin, Chandler, AZ (US)

(73) Assignee: MTD Products, Inc., Cleveland, OH (US)

( * ) Notice: Subject to any disclaimer, the term of this patent is extended or adjusted under 35 U.S.C. 154(b) by 577 days.

(21) Appl. No.: 10/366,092

(22) Filed: Feb. 12, 2003

(65) Prior Publication Data

US 2004/0154127 A1    Aug. 12, 2004

(51) Int. Cl.
 *A47L 5/14*    (2006.01)
(52) U.S. Cl. .................... 15/328; 15/405; 30/123.3
(58) Field of Classification Search ............. 15/328, 15/405, 344; 30/123, 276, 123.3; 56/12.7
 See application file for complete search history.

(56) References Cited

U.S. PATENT DOCUMENTS

| | | | |
|---|---|---|---|
| 4,124,938 A | | 11/1978 | Ballas, Sr. |
| 4,187,577 A | | 2/1980 | Hansen et al. |
| 4,227,280 A | * | 10/1980 | Comer ................ 15/405 |
| 4,242,794 A | * | 1/1981 | Peterson ............... 15/328 |
| 4,404,706 A | | 9/1983 | Loyd |
| 4,835,950 A | | 6/1989 | Cerreta |
| 5,768,749 A | * | 6/1998 | Ohi et al. ............. 15/405 |
| 6,415,585 B1 | * | 7/2002 | Morabit et al. ........ 56/12.7 |
| 2001/0027610 A1 | * | 10/2001 | Wheeler et al. ....... 30/276 |
| 2003/0140503 A1 | * | 7/2003 | Jerez .................. 30/276 |

FOREIGN PATENT DOCUMENTS

GB    2 246 939 A    2/1992

* cited by examiner

*Primary Examiner*—Theresa T. Snider
(74) *Attorney, Agent, or Firm*—Wegman, Hessler & Vanderburg

(57) ABSTRACT

A combination blower assembly and string trimmer whereby the string trimmer head is easily detachable without the use of any tools. The device includes a blower assembly that further includes an upper and lower housing mated together to form a volute-shaped cavity where an impeller with airfoil-shaped blades reside. The detachable string trimmer head is located under the lower housing of the blower assembly and is easily attached or removed from the blower assembly by a simple push and turn motion. The blower assembly further includes an air inlet and air inlet cover. When the air inlet cover is rotated to a position where the air inlet is open the blower assembly is operable and the string trimmer is inoperable. Furthermore, when the air inlet cover is rotated to a position where the air inlet is closed the blower assembly is inoperable and the string trimmer is operable.

19 Claims, 4 Drawing Sheets

COMBINATION BLOWER ASSEMBLY AND STRING TRIMMER

1. BACKGROUND OF THE INVENTION

A. Field of Invention

This invention relates to the field of lawn, garden, and home care and more specifically to a combination hand held string trimmer/blower device for use in cutting vegetation and clearing sidewalks, driveways, and the like free from debris.

B. Description of the Related Art

It is typically known in the art that a string trimmer is used to cut vegetation such as grass and the like using either one or more cutting strings or cutting blades. It is also known in the art to use a separate blower device to clear debris from sidewalks, driveways, and the like. There have been several attempts to combine a string trimmer with a blower either by providing a separate blower attachment or by incorporating both functions into one device.

One such example is U.S. Pat. No. 4,187,577 to Hansen et al. The Hansen patent discloses a blower attachment for use on a line trimmer. In order to use this invention one must remove a fastening device, then remove the string trimmer head before attaching the blower mechanism. This is a very tedious and time-consuming manner in which to convert a string trimmer to a blower. In addition, due to the configuration of the blower attachment, it is likely that the blower attachment will only fit on a limited number of line trimmers.

Another example of a combination trimmer/blower apparatus is disclosed in U.S. patent application 2001/0027610 to Wheeler et al. The Wheeler patent discloses a combination string and blade trimmer with an auxiliary blower. The disadvantage of this invention is that the blower continuously operates during operation of the trimmer. These dual functions operating at the same time may not be desirable to the operator.

The present invention provides methods and apparatuses for a new and improved combination blower/string trimmer device, which is simple in design, effective in use, and overcomes the aforementioned disadvantages.

II. SUMMARY OF THE INVENTION

According to another aspect of the present invention, a new and improved combination blower and trimmer assembly is provided that has a shaft, the shaft having a first and second end, a motor operatively connected to the first end of the shaft, a drive shaft having a first and second end, the drive shaft positioned within the shaft and extending from the first end of the shaft to the second end of the shaft, wherein the first end of the drive shaft is operatively connected to the motor and rotatably driven by the motor; an upper housing member operatively connected to the second end of the shaft, the upper housing having an air inlet and an air inlet cover, the air inlet cover having first and second positions, a lower housing member operatively connected to the upper housing thereby forming a cavity and an outlet with the upper housing, an impeller operatively positioned within the cavity and operatively connected to the second end of the drive shaft, and a detachable string trimmer head assembly operatively connected to the lower housing.

According to yet another aspect of the present invention, a new and improved combination blower and trimmer assembly is provided wherein when the air inlet cover is in the first position the impeller is operable and the string trimmer is inoperable and when the air inlet cover is in the second position the impeller is inoperable and the string trimmer head is operable.

According to yet another aspect of the present invention, a new and improved combination blower and trimmer assembly is provided where the detachable string trimmer head has a top portion having a connection shaft extend therefrom, the connection shaft further comprising a first and second end, wherein the first end of the connection shaft is operatively connected to the top portion of the string trimmer head and the second end is operatively connected to the second end of the drive shaft.

According to yet another aspect of the present invention, a new and improved combination blower and trimmer assembly is provided where the connection shaft comprises a plurality of projections, wherein the projection further comprises a centerline and the centerlines of adjacent projections are separated by an angle of 45 degrees or a multiple thereof.

According to yet another aspect of the present invention, a new and improved combination blower and trimmer assembly is provided where the upper and lower housings are volute shaped, wherein the lower housing further comprises a guard.

According to yet another aspect of the present invention, a new and improved combination blower and trimmer assembly is provided where the impeller has a plurality of airfoils, where the airfoils are arc shaped, a support plate to support the airfoils, wherein the support plate further consists of notches, wherein the impeller can rotate at a speed up to approximately 220 mph, and wherein the noise output is reduced by approximately 6 to 10 decibels.

According to yet another aspect of the present invention, a new and improved combination blower and trimmer assembly is provided wherein the impeller further has a plurality of airfoils, wherein the airfoils are arc shaped, a support plate to support the airfoils, wherein the support plate further consists of notches, wherein the impeller can rotate at a speed up to approximately 220 mph, and wherein the noise output is reduced by approximately 6 to 10 decibels.

Finally, another aspect of the present invention, a new and improved combination blower and trimmer assembly is provided where the noise output is reduced by approximately 8 decibels.

One advantage of this invention is the ease of converting from a blower function to a vegetation cutting function without the need to remove existing parts or add new parts to the existing device.

Another advantage to the present invention is that no tools are required to remove the detachable string trimmer head in order to refill the string trimmer head.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

IV. DESCRIPTION OF THE INVENTION

Figure 1:
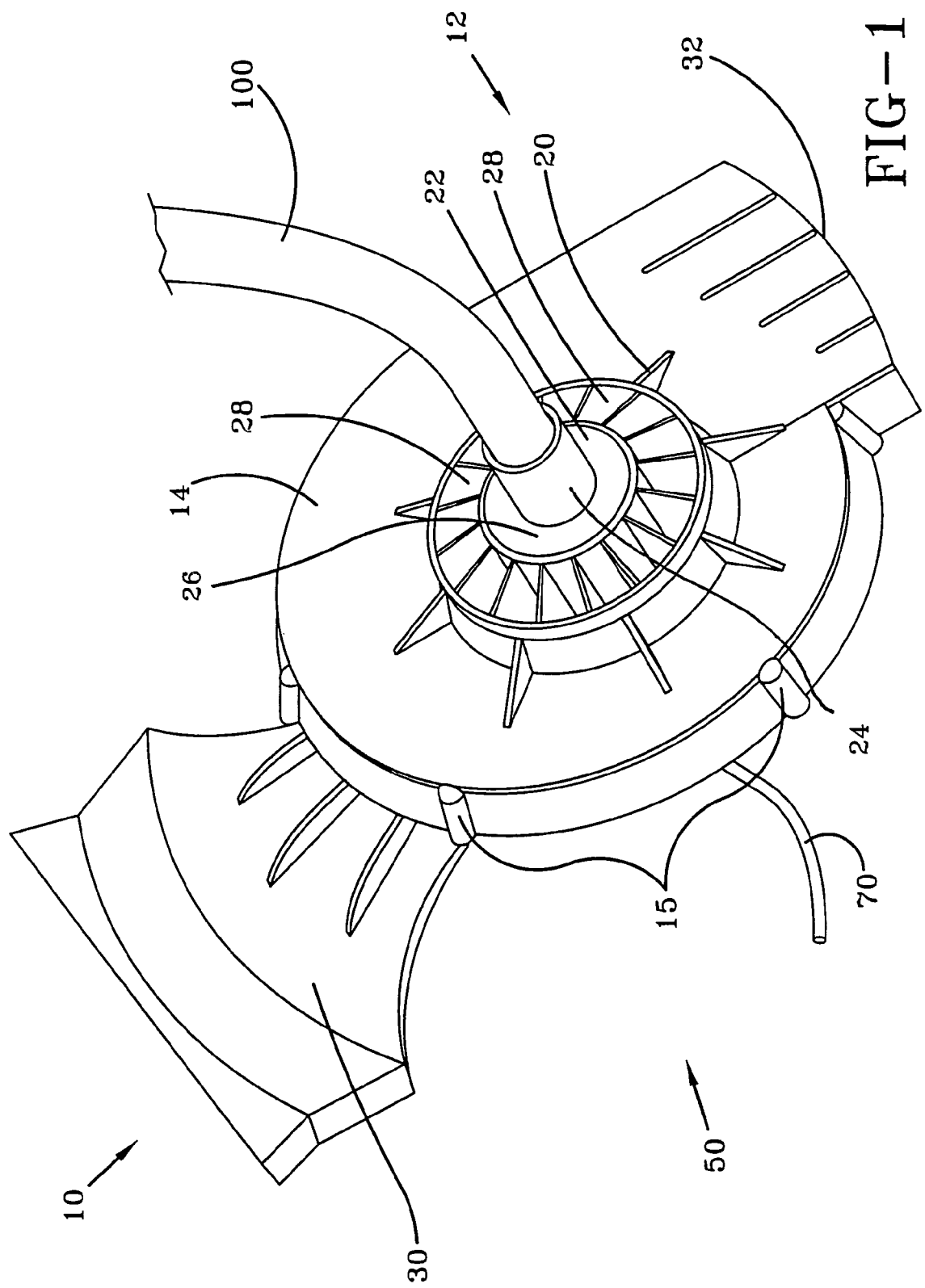
FIG. 1 is a perspective view showing the upper housing and the air inlet and air inlet cover.

Referring now to the drawings wherein the showings are for purposes of illustrating at least one embodiment of the invention only and not for purposes of limiting the same, FIG. 1 shows the combination blower/string trimmer assembly 10 fully assembled and connected to a shaft 100. In order to operate the blower/trimmer assembly 10, the shaft 100 may be connected to a motor (not shown) or the shaft 100 may be configured to accept an electrical extension cord (not shown) to operate via electricity. The shaft 100 further contains a drive shaft (not shown) that extends throughout the shaft 100. The drive shaft connects the motor to the blower/trimmer assembly 10 and drives either an impeller 18 (shown in FIG. 3) or the string trimmer head 16. Referring to FIGS. 1–4, two of the components of the blower/trimmer assembly 10 are the blower 12 and the string trimmer 50.

Referring to FIG. 1 the blower 12 consists of an upper housing 14, a lower housing 16, and an impeller 18. The impeller 18 is shown in FIG. 3 and will be described in detail below. Both the upper 14 and lower housing 16 are volute in shape. The upper housing 14 further consists of an air inlet 20, an air inlet cover 22, and a hub 24. In this embodiment the air inlet cover 22 is rotatable to a first and second position and further consists of openings 28 to allow air to flow into the air inlet 20 during the operation of the blower 12. The operation of the air inlet cover 22 will be further described below. The hub 24 is attached to the top 26 of the air inlet cover 22. The hub 24 further receives the shaft 100 as illustrated in FIG. 1. The upper housing 14 further contains a plurality of mounting holes 15 that mate with the mounting holes 36 of the lower housing 16. The mounting holes 36 in the lower housing 16 can best be seen in FIG. 2.

Figure 2:
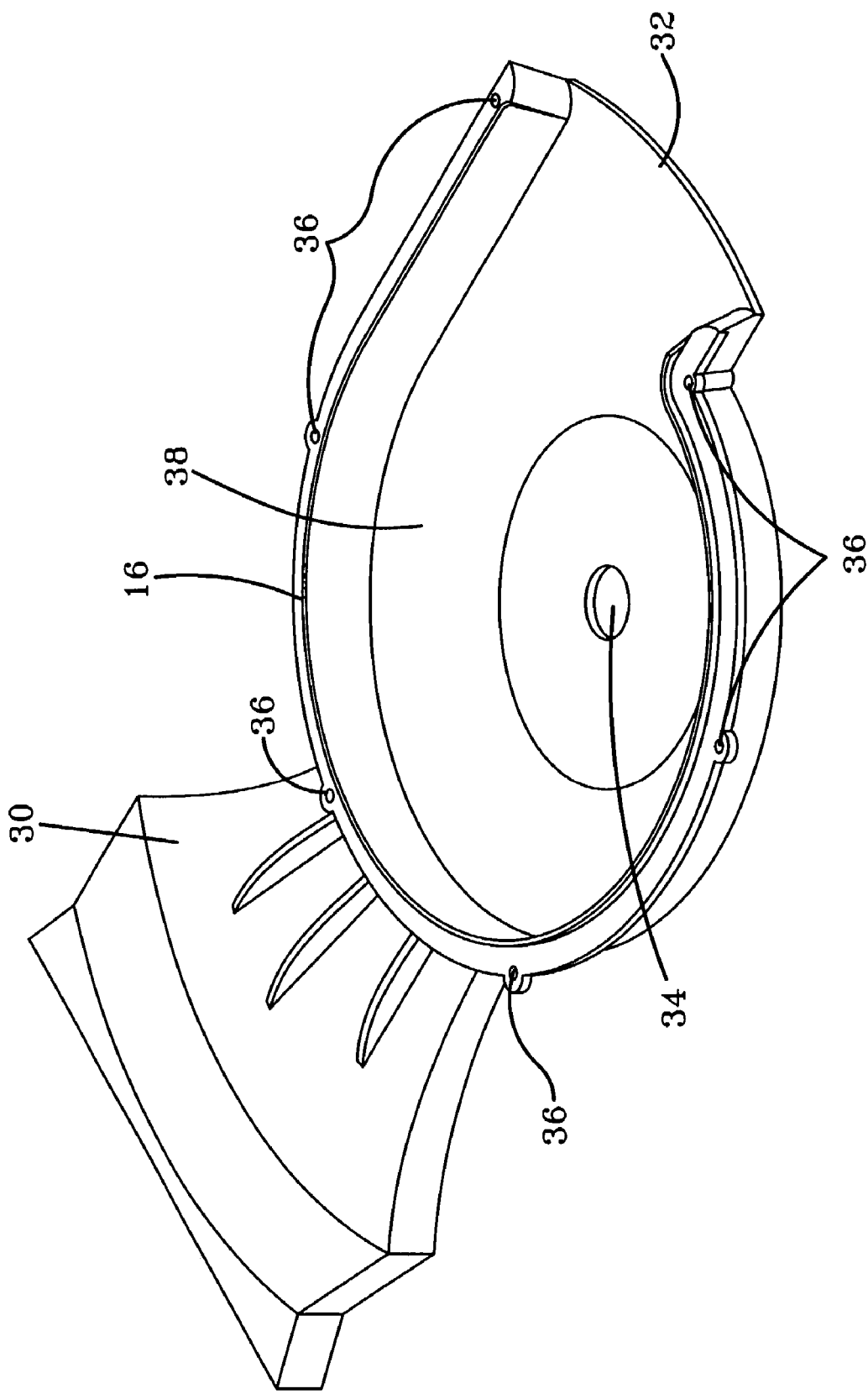
FIG. 2 is a perspective view of the lower housing.
Figure 3:
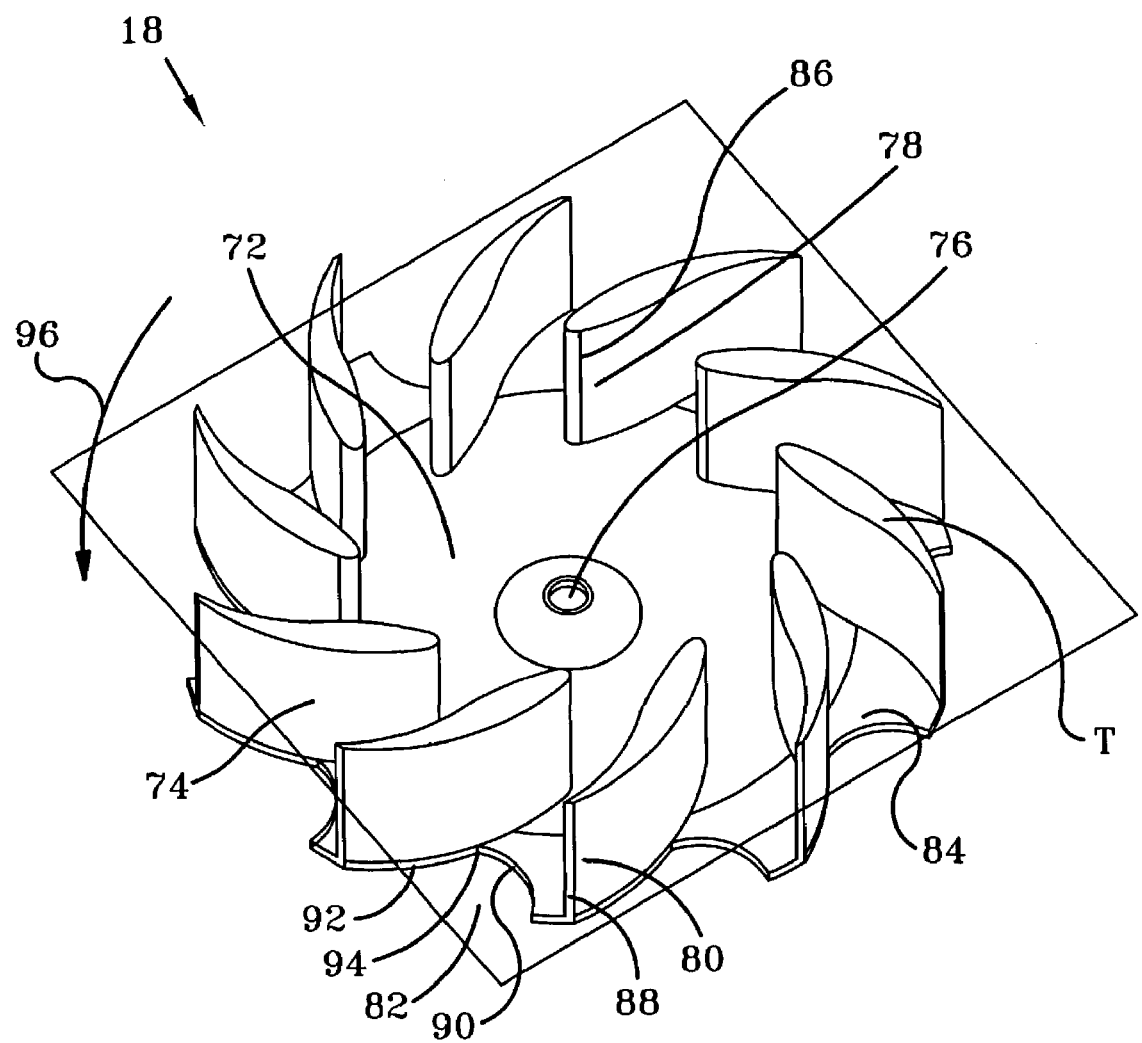
FIG. 3 is a perspective view of the impeller for the blower of FIG. 1.

Referring to FIG. 2 of this embodiment, the lower housing 16 further consists of a string trimmer guard 30. It should be noted that the string trimmer guard 30 is an accessory and is not required in the operation of the present invention. The lower housing 16 and string trimmer guard 30 may be one integrated piece or they may consist of two or more separate pieces. The string trimmer guard 30 is attached to the lower housing 16 on the side opposite blower outlet 32. The string trimmer guard 30 can be attached to the lower housing 16 by any mechanical means necessary chosen with sound engineering judgment. The lower housing 16 further consists of an aperture 34. The aperture 34 permits the attachment of the string trimmer head 52 and will be described in a subsequent paragraph.

As previously mentioned, the lower housing 14 also contains a plurality of mounting holes 36 that mate with mounting holes 15 of the upper housing 14. The upper 14 and lower 16 housing members can be connected by any mechanical means chosen with sound engineering judgment, such as a screw (not shown) or a nut and bolt (not shown). The lower housing 16 is attached to the upper housing 14 to form a cavity 38 within the two housing members 14, 16 where the impeller 18 resides. Prior to connecting the upper 14 and lower housing 16 the impeller 18 is connected to the drive shaft. The impeller 18 may be connected to the drive shaft by any mechanical means chosen with sound engineering judgment such as a nut and bolt (not shown) configuration or by attaching a cotter pin (not shown) through the drive shaft after the impeller 18 has been placed on to the drive shaft. After the impeller 18 is in place the lower housing 16 is connected to the upper housing 14 as previously described.

FIG. 3 shows the impeller 18 that resides in the cavity 38 formed by the upper 14 and lower 16 housings as described above. The impeller 18 consists of a substantially circular shaped plate 72 that contains an opening 76 in the center. The opening 76 receives the drive shaft as described in the previous paragraph. The plate 72 further consists of notches 82 located at the perimeter 84 of the plate 72. The notch design is such that the first edge 90 of the notch 82 intersects the second edge 92 of the notch 82 at a point 94 near the second end 80 of an airfoil 74. The intersection 94 of the first edge 90 and the second edge 92 can be at any point between the flat edge 88 of the second end 80 of the airfoil 74 and the half way point between the first 78 and second 80 ends of the airfoil 74, as long as chosen with sound engineering judgment. The notches 82 are designed to decrease the overall weight of the impeller 18, thereby permitting the impeller 18 to rotate at a high speed. In this embodiment the impeller 18 can rotate at a speed of up to approximately 220 mph. However, it should be noted that the impeller 18 can rotate at various speeds for the present invention to be effective. The impeller 18 further consists of a plurality of airfoils 74 that have an arc-like shape. The impeller 18 may consist of and number of airfoils 74 chosen with sound engineering judgment. In this embodiment the impeller 18 consists of ten airfoils 74. Each airfoil 74 has a first 78 and second 80 end and is connected to the plate 72. The airfoils 74 can be connected to the plate 72 by any mechanical means necessary chosen with sound engineering judgment, such as welding. As illustrated in FIG. 3 the first end 78 of the airfoil 74 has a rounded edge 86 and the second end 80 has a flat edge 88. In addition, the thickness T of the airfoil 74 decreases starting at the first end 78 and proceeding to the second end 80. The design of the airfoils 74 previously described also contributes to the overall lightweight design and efficiency of the impeller 18. In addition, the design of the airfoils 74 and the notch 82 on the plate 72 decrease the noise output of the impeller 18 in the range of 6 to 10 decibels. In this embodiment the decrease in noise is about 8 decibels.

Figure 4:
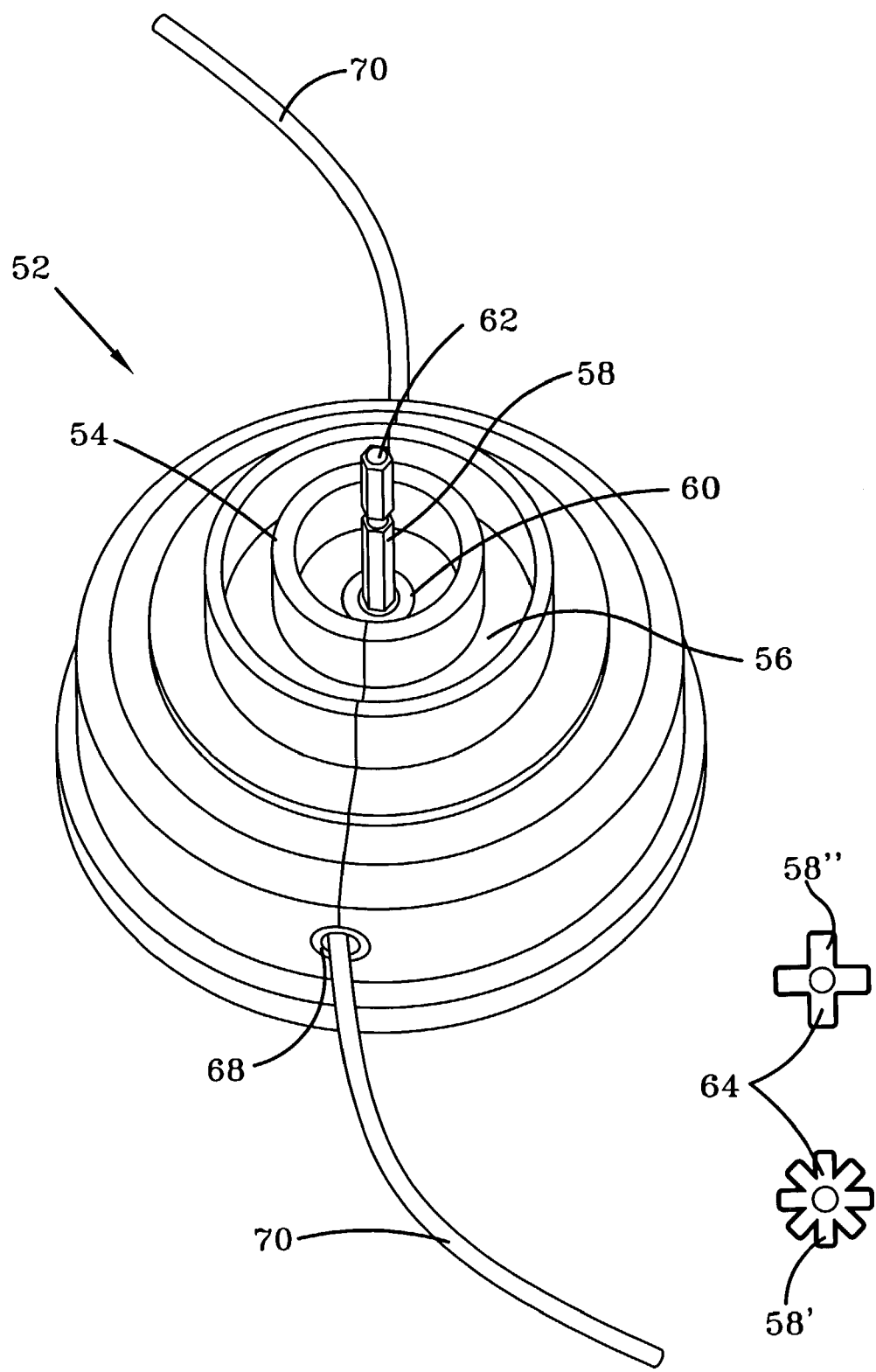
FIG. 4 is a perspective view of the string trimmer head.

Referring to FIGS. 1 and 4 the string trimmer 50 further consists of a detachable string trimmer head 52. The string trimmer head 52 further consists of a hub 54 located on the top 56 of the string trimmer head 52. Extending from the center of the hub 54 is a shaft 58 that consists of a first end 60 and a second end 62. The first end 60 of the shaft 58 is connected to the top 56 of the string trimmer head 52 and the second end 62 is received within the drive shaft. The shaft 58 may be connected to the top 56 of the string trimmer head 52 and the drive shaft by any mechanical means chosen with sound engineering judgment. The shape of the shaft 58 may be any shape chosen with sound engineering judgment such as triangular or octagonal. Furthermore, in another embodiment, the shaft 58' may also have projections 64 in order to better engage the drive shaft. The drive shaft, in this embodiment, will have a corresponding female shape to accept the shaft 58'. In this embodiment the number of projections 64 on the shaft 58' is eight and the centerlines of each adjacent projection are separated by a 45-degree angle. However, as illustrated in FIG. 4 any number of projections 64 may be used chosen with sound engineering judgment. The centerlines of adjacent projections may be separated by an angle of 45 degrees or any multiple thereof as illustrated in FIG. 4 by the shafts 58', 58". However, the centerlines of the adjacent projections may be separated by any angle chosen with sound engineering judgment. These different types of shafts 58, 58', 58" help more efficiently distribute the torque and so prevent the trimmer head 52 from becoming detached.

In order to attach the string trimmer head 52 the operator slides the hub 54 into the aperture 34 of the lower housing 16. Consequently, the shaft 58 is inserted and connected into the drive shaft. The string trimmer head 52 further consists of a plurality of apertures 68 located around the circumference of the string trimmer head 52. Extending through the apertures 68 is the cutting string 70 used to cut the vegetation. The connection of the string 70 within the string trimmer head 52 is commonly known in the art and will not be described herein. In this embodiment there are two apertures 68 on the string trimmer head 52 to allow the use of two cutting strings 70 to cut the vegetation. However, it should be noted that the string trimmer 50 could operate with one or more cutting strings 70.

With the components of the present invention herein described, the operation of the combination blower/trimmer assembly 10 will now be described. As previously mentioned the air inlet cover 22 is rotatable between a first and second position. When the air inlet cover 22 is rotated to a first position as illustrated in FIG. 1 the blower 12 is operable and the string trimmer 50 is inoperable. Conversely, when the air inlet cover 22 is in the second position the blower 12 is inoperable and the string trimmer 50 is operable. Furthermore, when the air inlet cover 22 is in the first position the openings 28 of the air inlet cover 22 are aligned with the air inlet 20 thereby allowing air to flow into and through the blower 12 and out the blower outlet 32. Therefore, in order to use the blower 12 the operator, prior to starting the motor (not shown), rotates the air inlet cover 22 to the first position as shown in FIG. 1. The operator then starts the motor and uses a typical control device (not shown) on the shaft 100 to operate the blower 12. The operation of the moor and control device is commonly known in the art and will not be described herein. During operation of the blower 12 the impeller 18 rotates in a direction as indicated by the arrow 96 as shown on FIG. 3. When the operator wishes to use the string trimmer 50 the operator turns off the motor and rotates the air inlet cover 22 to a second position. In this position the openings 28 on the air inlet cover 22 are not aligned with the air inlet 20. The operator then restarts the motor and uses a control device to operate the string trimmer 50. In order to increase the length of the cutting string 70 the operator simply taps the string trimmer head 52 on the ground or any rigid surface to permit the cutting string 70 to temporarily release and lengthen. It should be noted that the procedure previously described is merely one embodiment. Means to switch between the blower 12 and the string trimmer 50 can be any mechanical or electrical means chosen with sound engineering judgment such as a switch, lever, or the like. It should be further noted that the string trimmer head 51 is detachable and is not necessary for the operation of the blower 12.

Several embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

The invention claimed is:

1. A combination blower and trimmer assembly characterized by:
   a shaft, the shaft having a first and second end;
   a motor operatively connected to the first end of the shaft;
   a drive shaft having a first and second end, the drive shaft positioned within the shaft and extending from the first end of the shaft to the second end of the shaft, wherein the first end of the drive shaft is operatively connected to the motor and rotatably driven by the motor;
   an upper housing member operatively connected to the second end of the shaft, the upper housing having an air inlet and an air inlet cover, the air inlet cover having first and second positions;
   a lower housing member operatively connected to the upper housing, the upper and lower housing members combining to form a cavity and an outlet leading from the cavity;
   an impeller operatively positioned within the cavity and operatively connected to the second end of the drive shaft; and,
   a detachable string trimmer head operatively connected to the lower housing member.

2. The combination blower and trimmer assembly of claim 1, wherein when the air inlet cover is in the first position the impeller is operable and the string trimmer head is inoperable and when the air inlet cover is in the second position the impeller is inoperable and the string trimmer head is operable.

3. The combination blower and trimmer assembly of claim 2, wherein the detachable string trimmer head is further characterized by:
   a top portion having a connection shaft extending therefrom, the connection shaft further comprising a first and second end, wherein the first end of the connection shaft is operatively connected to the top portion of the string trimmer head and the second end is operatively connected to the second end of the drive shaft.

4. The combination blower and trimmer assembly of claim 3, wherein the connection shaft comprises a plurality of projections.

5. The combination blower and trimmer assembly of claim 1, wherein the upper and lower housing members are volute shaped, wherein the lower housing member further comprises a guard.

6. The combination blower and trimmer assembly of claim 5, wherein the impeller is further characterized by:
   a plurality of airfoils, wherein the airfoils are arc shaped; and
   a support means to support the airfoils, wherein the support means further consists of notches.

7. A combination blower and trimmer assembly characterized by:
   an upper housing member, the upper housing having an air inlet and an air inlet cover, the air inlet cover having first and second positions;
   a lower housing member operatively connected to the upper housing, the upper and lower housing members combining to form a cavity and an outlet leading from the cavity;
   an impeller operatively positioned within the cavity; and,
   a detachable string trimmer head operatively connected to the lower housing member.

8. The combination blower and trimmer assembly of claim 7, wherein when the air inlet cover is in the first position the impeller is operable and the string trimmer head is inoperable and when the air inlet cover is in the second position the impeller is inoperable and the string trimmer head is operable.

9. The combination blower and trimmer assembly of claim 8, wherein the detachable string trimmer head assembly is further characterized by:
a top portion having a connection shaft extending therefrom, the connection shaft further comprising a first and second end, wherein the first end of the connection shaft is operatively connected to the top portion of the string trimmer head and the second end extends through an opening in the lower housing member.

10. The combination blower and trimmer assembly of claim 9, wherein the connection shaft comprises a plurality of projections.

11. The combination blower and trimmer assembly of claim 14, wherein the upper and lower housing members are volute shaped, wherein the lower housing member further consists of guard.

12. The combination blower and trimmer assembly of claim 11, wherein the impeller is further characterized by:
a plurality of airfoils, wherein the airfoils are arc shaped; and
a support means to support the airfoils, wherein the support means further consists of notches.

13. A method of using a combination blower and trimmer assembly, comprising the steps of:
providing a blower assembly having a drive shaft, an upper housing having an air inlet, an air inlet cover, a lower housing, an impeller in a cavity formed by the upper and lower housings, and a string trimmer head positioned below the lower housing;
rotating the air inlet cover to a first position thereby de-engaging the string trimmer head from the drive shaft and positioning the air inlet cover respective the air inlet so that air flows into the cavity and to the impeller so that the impeller delivers a high-velocity stream of air out of a blower outlet.

14. The method of claim 13, further comprising the steps of:
rotating the air inlet cover to a second position thereby positioning the air inlet cover respective the air inlet so that air is substantially blocked from flowing through the air inlet and reaching the impeller and engaging the string trimmer head with the drive shaft.

15. A portable multi-purpose tool powered by a power source for use as an air blower capable of delivering a high-velocity stream of air when the multi-purpose tool is in a blower mode of operation and also as a rotating string trimmer head capable of trimming vegetation when in the multi-purpose tool is in a trimmer mode of operation, the multi-purpose tool comprising:
a blower housing defining an enclosed cavity and comprising at least one air inlet leading to said cavity and a blower outlet for directing air out of said cavity;
a drive shaft positioned at least partially within the blower housing, the drive shaft being configured to be rotated by said power source;
an impeller located within said cavity, said impeller being operatively connected to the drive shaft so as to be rotatable within said cavity to deliver a high-velocity stream of air out of said blower outlet;
a trimmer head having at least one cutting line, said trimmer head being positioned below said blower housing and operatively connected to the drive shaft so as to be selectively rotatable by said power source; and
a selectively positionable air inlet cover, wherein the blower housing defines an air pathway between the air inlet in the blower housing and the impeller, the pathway being open when the multi-purpose tool is in the blower mode of operation so that air flows through the at least one air inlet and to the impeller, and the pathway being substantially blocked by the air inlet cover when the multi-purpose tool is in the trimmer mode of operation so that air is substantially prevented from flowing between the at least one air inlet and the impeller.

16. The multi-purpose tool according to claim 15 wherein the blower housing further comprises a string trimmer guard configured to protect the operator from flying vegetation clippings.

17. The multi-purpose tool according to claim 16 wherein the string trimmer guard is manufactured as an integrated part of the blower housing.

18. The multi-purpose tool according to claim 16 wherein the string trimmer guard is manufactured as a separate component from the blower housing and is attached to the blower housing with fasteners.

19. The multi-purpose tool according to claim 16 wherein the string trimmer guard is positioned on the blower housing on the side opposite blower outlet.

* * * * *